Oct. 30, 1928.  1,689,525
V. A. FYNN
ASYNCHRONOUS MOTOR
Filed Dec. 18, 1925    2 Sheets-Sheet 1

Inventor:
VALÈRE ALFRED FYNN,
By John H. Bruninga
His Attorney.

Oct. 30, 1928.

V. A. FYNN 1,689,525

ASYNCHRONOUS MOTOR

Filed Dec. 18, 1925

2 Sheets-Sheet 2

Inventor:
VALÈRE ALFRED FYNN,
By John N. Bruninga
His Attorney.

Patented Oct. 30, 1928.

1,689,525

UNITED STATES PATENT OFFICE.

VALÈRE A. FYNN, OF ST. LOUIS, MISSOURI.

ASYNCHRONOUS MOTOR.

Application filed December 18, 1925. Serial No. 76,151.

My invention relates to polyphase non-synchronous motors and particularly to the starting, the operation and the control or improvement of the power factor of such machines.

The nature of the invention is fully set forth in the specification taken in conjunction with the accompanying drawings and particularly pointed out in the appended claims.

Figure 1:
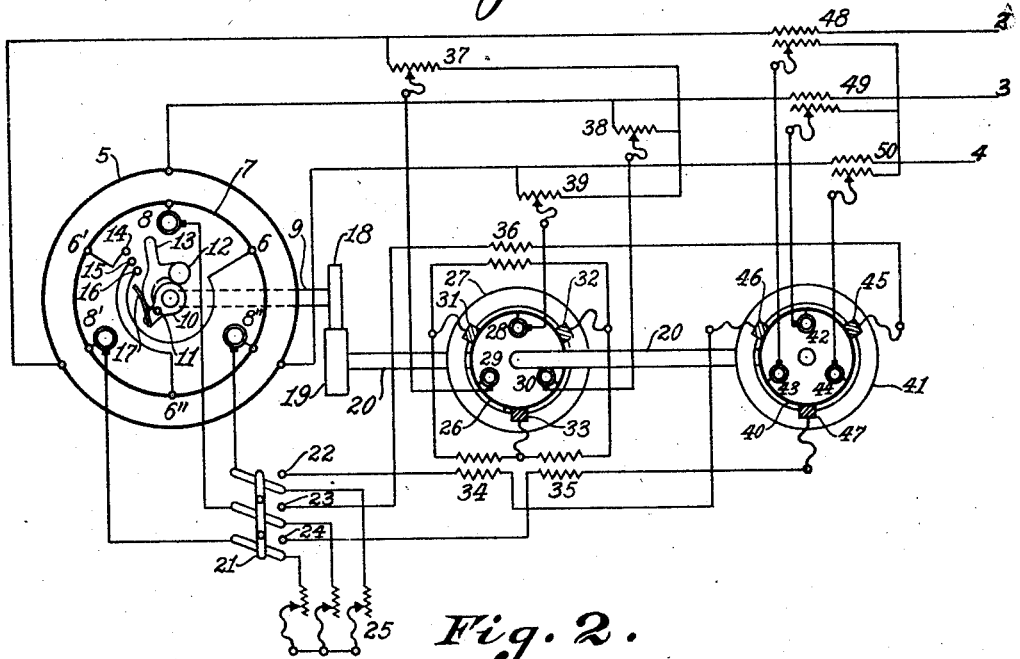
Figure 2:
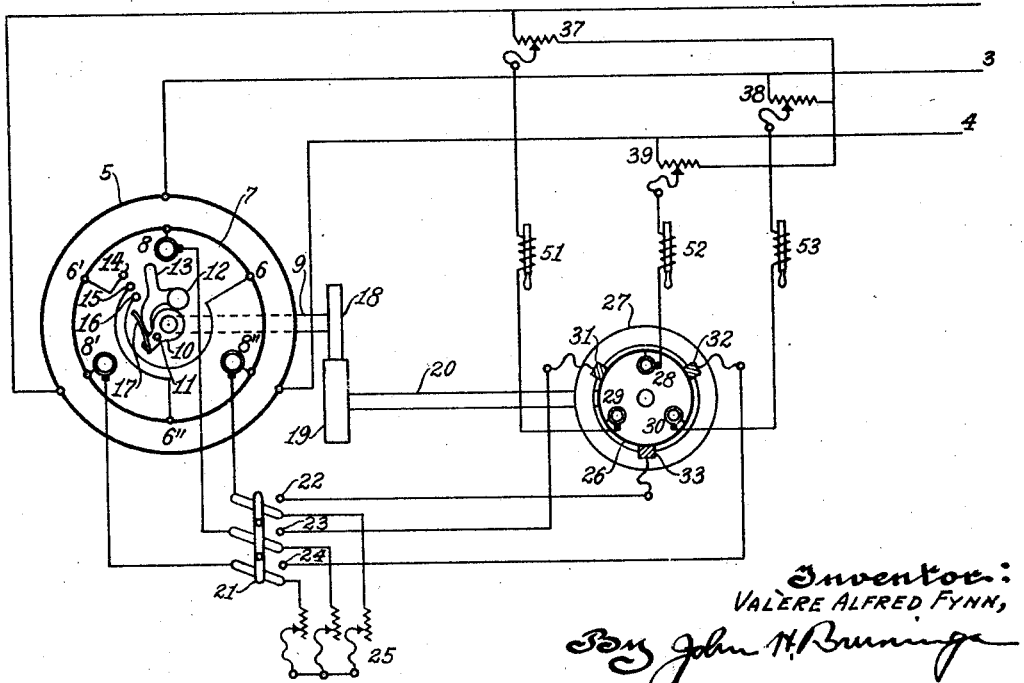
Figure 3:
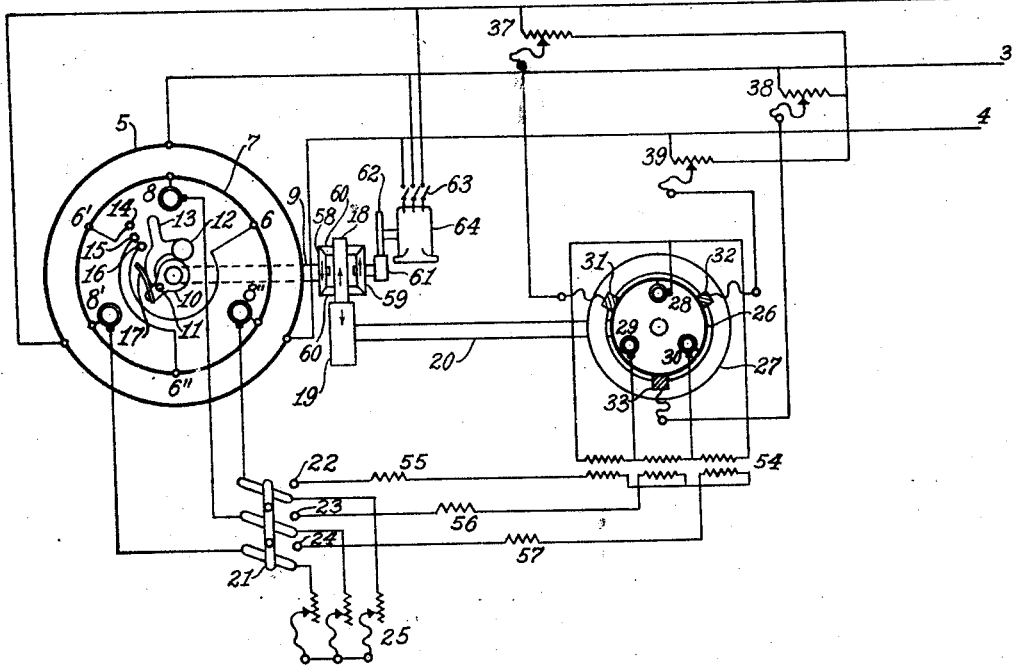

The drawings diagrammatically illustrate two-pole embodiments of my invention. Fig. 1 shows a three-phase motor with two auxiliary machines included in some of its secondary circuits. Fig. 2 shows a like motor with a single auxiliary in some of its secondary circuits and Fig. 3 shows a three-phase motor with a single differently connected and differently driven auxiliary in some of its secondary circuits.

Referring to Fig. 1, the stator carries the primary three phase winding 5 connected to the supply 2, 3, 4 with the interposition of the series transformers 48, 49, 50. The secondary carries a single distributed winding 7 with six taps per pole pair, adjacent taps being displaced by 60 electrical degrees and being therefore equally spaced in the electrical sense of this expression. This winding may be described as a six-phase mesh connected winding or as the combination of two three-phase mesh connected windings displaced by 60 electrical degrees one from the other. Alternate taps or phase connections 6, 6', 6'' lead to the switch contacts 14, 15, 16 with which co-operates the centrifugally controlled short-circuiting blade 13 which is preferably insulated from the member 12 which carries this blade. The connections or taps 6, 6', 6'' determine the working paths through 7. The weighted member 12 is pivoted at 11 on a hub or sleeve 10 carried and driven by the shaft 9 of the motor and held away from the contacts 14, 15, 16 by the spring 17. This spring is so dimensioned that the weighted member 12 can overpower same, at some speed preferably below the range of operating speeds of the motor, and thus shortcircuit the secondary winding 7 at the points 6, 6', 6'', to form a three-phase secondary working winding or three-phase secondary working circuits. The remaining alternate taps or phase connections determine the exciting paths through 7 and are taken to the sliprings 8, 8', 8'' to make it possible to form three-phase secondary exciting circuits displaced from the secondary working circuits by 60 electrical degrees.

Mounted on the shaft 20 driven from the motor shaft 9 through the gear wheels 18, 19 are two frequency converters 26, 27 and 40, 41. The revolving member of the first carries a commuted winding 26 connected to a three-phase arrangement of sliprings 28, 29, 30 and cooperating with the three-phase arrangement of adjustable commutator brushes 31, 32, 33 which are shown as resting directly on the commuted winding represented by a plain circle in the figure whereas in practice said brushes would, of course, co-operate with a commutator connected to said commuted winding. The revolving member is surrounded by a laminated stator 27 devoid of polar projections. The sliprings 28, 29, 30 are connected to the supply through the adjustable ratio shunt transformers 37, 38, 39. The commutator brushes are connected to one winding of each of the three transformers 34, 35, 36, the other windings of said transformer being connected to the switch contacts 22, 23, 24 and to the commutator brushes 45, 46, 47 of the second frequency converter. The revolving member of this second frequency converter is also surrounded by a laminated stator 41. It carries a commuted winding 40 which is connected to the three-phase arrangement of sliprings 42, 43, 44 and which co-operates with the three-phase arrangement of adjustable commutator brushes 45, 46, 47 shown as resting directly on the circle representing the commuted winding 40. The sliprings 42, 43, 44 are connected to the supply through the adjustable ratio series transformers 48, 49, 50. Because the auxiliary frequency converters have the same number of poles as the motor the gear wheels 18 and 19 have the same pitch diameter. As a rule the number of poles of the motor will be greater than the number of poles of the frequency converters and shaft 20 will have to be driven at a correspondingly higher speed so that when the speed of the motor is synchronous, that of the frequency converters is also synchronous.

The connections from the supply to each of the frequency converters are so made that the revolving flux set up by the supply in each of said machines revolves in a direction opposed to that in which the revolving members of the frequency converters are driven by the motor. When so connected the revolving field produced by the currents derived from the supply will, at all times, revolve synchronously with respect to the commuted winding 26 and 40 but its speed in space with respect to the stationary commutator brushes will always be proportional to the slip of the motor 5, 7. Under these conditions the amplitude of the commutator brush voltages will be independent of the speed but dependent on the magnitude of the revolving flux while the frequency of said voltages will depend on the speed of the revolving flux with respect to the commutator brushes and will always be of the slip frequency of the motor. Normally the magnitude of the revolving flux will be very nearly constant so long as the slipring voltage is constant.

The sliprings 8, 8', 8'' are connected to the movable member of the three-pole two-throw switch 21 adapted to connect said sliprings to the starting impedances, or to the two frequency converters. In the position of switch 21 shown in the figure the sliprings 8, 8', 8'' are connected to the starting resistances 25. In its other position switch 21 connects the sliprings 8, 8', 8'' to the frequency converters by means of the switch contacts 22, 23, 24.

In Fig. 2 the construction and arrangement of the motor are identical with those of Fig. 1, the starting circuits are also the same but there is only one frequency converter mounted on the shaft 20. This converter comprises a revolving member mounted on the shaft 20 and provided with a commuted winding 26 connected to a polyphase arrangement of sliprings 28, 29, 30. This commuted winding also co-operates with a polyphase arrangement of commutator brushes 31, 32, 33 shown as resting directly on the winding 26. The revolving member is surrounded by a stationary member 27 which is preferably laminated and preferably devoid of polar projections as in all the other figures. The sliprings of the frequency converter are connected to the supply through the adjustable ratio shunt transformers 37, 38, 39 with the interposition of the adjustable impedances 51, 52, 53. The commutator brushes are connected to the switch contacts 22, 23, 24 of the two-way switch 21. The connections between the sliprings 28, 29, 30 and the supply are so made that the revolving field produced in the frequency converter by the currents fed into it from the line revolves in a direction opposed to that in which the commuted winding 26 of said converter is driven by the motor shaft 9. The two-way three-pole switch is adapted to connect the three-phase exciting paths on the motor determined by the sliprings 8, 8', 8'' either to the starting resistances 25 or to the frequency converter commutator brushes 31, 32, 33.

In Fig. 3 the asynchronous motor, 5, 7 and the starting circuits controlled by the switch 21 are the same as in Figs. 1 and 2 but there is only one frequency converter mounted on the shaft 20, it is driven through differential gearing and its connections differ from those of the converter shown in Fig. 2. The differential gearing interposed between the converter shaft 20 and the motor shaft 9 comprises the gear wheel 58 mounted on the shaft 9 and the gear wheel 59 driven by the synchronous motor 64 through the gear wheels 61, 62 at double the synchronous speed of the asynchronous motor 5, 7. Because, in this example, the asynchronous motor has but two poles the gear wheels 62, 61 of two to one ratio are interposed between the two pole synchronous motor and the gear wheel 59. The three-phase auxiliary synchronous motor 64 can be connected to the line 2, 3, 4 by means of the three pole switch 63. The pinions 60 of the differential carry the gear wheel 18 which meshes with the gear wheel 19 of same diameter mounted on the converter shaft 20. With this arrangement the two-pole frequency converter 26, 27 will run synchronously if and when the asynchronous two-pole motor 5, 7 runs synchronously; at sub-synchronous speeds of the asynchronous motor the converter will run at corresponding supersynchronous speeds, the negative slip of the asynchronous motor being transformed into a positive slip of the converter. In other words if the asynchronous motor falls 5% below its synchronous speed the frequency converter will rise by a like percentage above its synchronous speed.

The revolving member of the frequency converter of Fig. 3 carries a commuted winding 26 connected to a polyphase arrangement of sliprings 28, 29, 30 and cooperating with the polyphase arrangement of adjustable commutator brushes 31, 32, 33. The revolving member is surrounded by a stationary laminated member 27 devoid of polar projections. The commutator brushes are connected to the supply through the adjustable ratio shunt transformers 37, 38, 39. The sliprings 28, 29, 30 are connected to the switch contacts 22, 23, 24 through the three-phase transformer 54 with the interposition of the impedances 55, 56, 57. In this embodiment the connections between the commutator brushes 31, 32, 33 and the supply are so made that the currents fed to the converter winding 26 produce a revolving field in this machine which rotates in the direction in which the frequency converter is driven by the motor. Under these conditions there will be no voltages generated in the winding 26 by the revolving field of same when the converter winding revolves synchronously with respect to the frequency of the supply, but when it revolves at sub or at super synchronous speeds then, the voltages generated therein by said field and appearing at the sliprings will be of the frequency of the voltages concurrently generated in the secondary of the motor provided the gearing between the shafts 9 and 20 is so designed that the ratio of the speeds of the shafts 9 and 20 is the same as the ratio of the number of poles of the frequency converter to the number of poles of the motor.

Turning now to the mode of operation and referring more particularly to Fig. 1, at starting the automatic switch 13 is open and the switch 21 connects the sliprings 8, 8', 8'' to the starting resistances 25. The frequency converters mounted on the shaft 20 can be disconnected from the supply or not as desired, say they are disconnected. After connecting the primary 5 of the motor to the supply 2, 3, 4 the machine is brought up to speed by means of the resistances 25 as is usual with polyphase slipring motors of standard construction. At some selected rotor speed, determined by the weight of the member 12 and by the spring 17 of the automatic rotor switch and preferably just a little lower than the lowest normal operating speed of the motor, the switch blade 13 will shortcircuit the switch points 14, 15, 16 thus forming low impedance three-phase secondary working circuits along paths in 7 determined by the taps or connecting points 6, 6', 6'' and dimensioned and located to facilitate the formation of working currents therein. So soon as switch 13 is closed switch 21 may be opened without interfering with the operation of the motor. This is now done, switch 21 is thrown over to the switch contacts 22, 23, 24 and the sliprings of the two frequency converters are connected to the supply.

The converter 26, 27 is connected in shunt relation to the supply and adjusted to generate polyphase voltages of the frequency, magnitude and phase necessary to produce a revolving field of such speed, axis and magnitude from the secondary of the motor and by means of the secondary three-phase exciting paths determined by the sliprings 8, 8', 8'' as will yield the desired power-factor characteristic. The frequency of these exciting voltages depends on the speed of the converter, their magnitude can be regulated by means of the adjustable transformers 37, 38, 39 and their phase is adjusted by suitably locating the three-phase arrangement of commutator brushes 31, 32, 33. The phase of these exciting voltages, on the assumption of a total absence of reactance in the exciting circuits, should lead by about 90 degrees the phase of the working voltages generated by the revolving flux of the motor in the secondary exciting paths of same as they appear at the sliprings 8, 8', 8''. But the reactance of the secondary 7 of the motor and of the rest of the polyphase exciting circuits which, in Fig. 1, also include the frequency converter 40, 41 is not zero in normal operation of the motor and for this reason the phase relation between the voltages at the terminals of the converter 26, 27 and the working voltages in the exciting paths should differ somewhat from the quadrature relation specified above to the end that the currents due to them, which appear in the secondary 7, and therefore the revolving flux produced from the rotor, be substantially coaxial with the revolving flux which can be produced from the primary. As a rule phase and magnitude of the exciting voltages do not require any adjustment throughout the load range of the motor.

The frequency converter 40, 41 is connected in series relation with the supply and adjusted to generate polyphase slip-frequency voltages which substantially equal and oppose the working voltages concurrently generated in the secondary exciting paths of the motor. The magnitude of these converter voltages depends on the transformation ratio of the transformers 48, 49, 50 and on the current in the primary of the motor which current varies almost proportionally with the motor slip on which the magnitude of the secondary working voltages depends. The phase of these working-voltage-opposing voltages should lead the said working voltages by 180 degrees and must, therefore, lead the exciting voltages by about 90 degrees.

The combined voltages of the two converters are introduced into the secondary of the motor by way of the slip rings 8, 8', 8''. These auxiliary slip frequency voltages therefore have two components, the exciting components, the phases of which are chosen to produce in the secondary winding of the motor a revolving flux of proper speed and axis, and the working voltage-opposing-components intended to oppose the formation of working currents in the secondary exciting circuits and displaced in phase by 180 degrees with respect to said working voltages.

The transformers 34, 35, 36 are used, among other things, to connect the two converters in series relation without placing the secondary motor winding in conductive relation with the primary.

The motor of Fig. 1 can also be operated without the converter 26, 27 and the transformers 34, 35, 36. In such case, the commutator brushes 45, 46, 47 can be set to deliver to the secondary exciting circuits of the motor polyphase currents which will produce a revolving flux of proper axis, or they can be set to deliver such currents and to simultaneously oppose the formation of load currents in the motor exciting circuits. In either case it is of advantage to destroy the proportionality between the currents in the primary of the motor and those in the exciting circuits thereof causing the latter to increase but slowly or remain as constant as possible notwithstanding the steady increase of the primary currents with increasing motor load.

One way to achieve this end is to so design the series transformers 48, 49, 50 or the converter 40, 41 that at least some part of the magnetic circuit of the one or the other is worked at very high densities after the normal value of the secondary exciting currents of the motor is approached.

In the case of Fig. 2 the starting operation can be identical with that described in connection with Fig. 1 but there is only one frequency converter 26, 27 included in the secondary exciting circuits in normal operation together with adjustable impedances 51, 52, 53. This embodiment can be operated by adjusting the phase and magnitude of the slip frequency voltages derived from the commutator brushes to produce, from the motor secondary, a revolving flux of proper speed and axis and of the desired magnitude and by relying on the impedances 51, 52, 53 to oppose the formation of working or load currents in the exciting circuits. In such case the impedances may be with or without reactance. The magnitude of the auxiliary voltages depends on the transformation ratio of the transformers 37, 38, 39, their phase on the location of the commutator brushes 31, 32, 33. The loss in the exciting circuits is somewhat smaller when the impedances have reactance.

This embodiment can also be operated by so selecting the phase and magnitude of the auxiliary voltages derived from the frequency converter and introduced into the secondary exciting circuits of the motor, that one set of components of said voltages is of proper magnitude and phase to suitably excite the motor from the secondary while the other set of components equals and opposes the working voltages generated in the exciting paths at some selected load. In this case the impedances 51, 52, 53 can be greatly reduced or entirely eliminated.

According to a third method of operating Fig. 2 the impedances 51, 52, 53 are given maximum positive reactance values for the chosen exciting currents which, about equal the working voltages generated in parts of said exciting circuits at some selected motor load while the phase and magnitude of the auxiliary voltages appearing at the commutator brushes are so chosen that at no load of the motor they produce exciting voltages at the sliprings 8, 8', 8'' which are of the desired phase and magnitude. This adjustment can be made, for instance, by correspondingly locating the commutator brushes. As the load increases the reactances are reduced, for instance, by gradually withdrawing the cores shown in Fig. 2. This changes the phase and magnitude of the voltages impressed on the sliprings 28, 29, 30 of the converter and consequently also the phase and magnitude of the commutator brush voltages, increasing with increasing load the magnitude of the latter and their phase lead over the working voltages in the exciting circuits and thus providing the auxiliary voltages introduced into the secondary exciting circuits with working-voltage-opposing components which increase with increasing motor load.

In Fig. 3 the starting operations can be identical with those described in connection with Figs. 1 and 2 but here again there is but one frequency converter in the exciting circuits in normal operation. Furthermore, in the converter of Fig. 3 the revolving flux produced therein by the currents derived from the supply rotates in the same direction in which the winding 26 of the converter is driven by the motor. This causes the winding 26 to offer a varying reactance to the line currents. This reactance is positive at sub and negative at supersynchronous speeds, its positive maximum occurs when the converter is at a standstill and is theoretically nil when the latter revolves synchronously. The result is that the magnitude of the revolving flux in the converter, which depends on the magnetizing current taken by said machine from a constant voltage line, varies with the speed of said converter being a maximum when the speed is synchronous. At synchronism there can be no voltage generated in 26 by the synchronously revolving field produced by the line currents introduced into the converter by the commutator brushes 31, 32, 33 but differences of potential due to ohmic drop in 26 can be observed at the sliprings 28, 29, 30. At super and subsynchronous speeds voltages are generated in 26 and appear at the sliprings, they increase with increasing positive or negative slip. Furthermore, the phase of these voltages also changes with changing magnitude and direction of slip. When the converter is at rest the magnetizing currents taken by the converter from the line lag by practically 90 degrees behind the line voltages. This lag diminishes steadily as the speed increases. At synchronism the magnetizing current is practically in phase with the line voltage and at supersynchronous speeds the phase of the magnetizing currents leads the line voltages more and more with increasing speed. The phase of the slipring voltages follows the phase of the revolving field of the converter which is determined by the phase of the magnetizing currents, with the result that, with synchronism as a starting point, the slipring voltages lag more and more with respect to the line voltages with decreasing speeds while with increasing speeds they lead line voltages more and more. The slipring voltages lag at sub and lead at supersynchronous speeds. At the same time, and as previously explained, the magnitude of the generated voltages appearing at the sliprings 28, 29, 30 increases when the converter departs from synchronism. The phase of the slipring voltages can, at any given converter speed, be changed with reference to the phase of the line voltages by displacing the commutator brushes 31, 32, 33.

After the asychronous motor is up to speed it is probable that the converter will be at rest and the synchronous motor 64, being more easily driven, will be running at about half speed. The auxiliary motor can now be connected to the line by means of the switch 63 and when it has reached its synchronous speed the converter will be running supersynchronously exceeding its synchronous speed by the percent slip of the asynchronous motor. In order to so excite the unloaded asynchronous motor from its secondary as to improve its power factor the commutator brushes 31, 32, 33 must be so located that the slip frequency voltages impressed on the motor slip rings 8, 8′, 8″ lead the working voltages generated in 7 and appearing at said sliprings by about 90 degrees in phase. The degree of phase compensation at no-load can then be adjusted by means of the transformers 37, 38, 39. When a load is placed on the asynchronous motor its negative slip will increase causing an increase in the working voltages appearing at the sliprings 8, 8′, 8″. Concurrently the positive slip of the frequency converter used as an exciter will increase in like proportion causing the magnitude and the phase lead of the voltages impressed on the sliprings 8, 8′, 8″ to increase. These voltages will now lead the working voltages at said sliprings by more than 90 degrees and will therefore have working-voltage-opposing components. The net result is that with increasing slip both components the exciting and the working-voltage-opposing component, of the polyphase auxiliary voltages derived from the frequency converter increase with increasing load on the asynchronous motor.

The settings can be so made that the asynchronous motor operates with a lagging power factor at no-load and at light loads, the power factor rising with increasing load to unity and then becoming leading. In such case it is not necessary to make use of the transformer 54 and the impedances 55, 56, 57 which here may be omhic resistances, can be utilized to help check the formation of load currents in the exciting circuits.

The settings can, however, also be so made that the power factor of the asynchronous motor is raised higher at no-load and thereafter kept fairly constant by using the transformer 54 and operating same at high magnetic densities at no-load or at light loads of the asynchronous motor. Here again the impedance 55, 56, 57 may be used to check the formation of working or load currents and may be devoid of reactance.

The converters shown in Figs. 1 and 2 and in which the revolving field rotates in a direction opposed to that in which the converter is driven by the motor can also be driven supersynchronously in the manner explained in connection with Fig. 3 or in some like manner.

The converter of Fig. 3 can further be used at subsynchronous speeds, without the interposition of the differential gear shown in the figure being driven exactly like the converter of Fig. 2, but in such case the phase of the auxiliary voltages will lag more and more with increasing slip and instead of these voltages leading the working voltages by more than 90 degrees with increasing motor load they will lead said voltages by less than 90 degrees and this lead will decrease with increasing motor slip. These conditions can be made acceptable but the arrangement involving supersynchronous converter speeds is mostly preferred.

Frequency converters of the type shown in Fig. 3 can be used to advantage in connection with asynchronous motors having but one set of polyphase circuits on the secondary which set then carries working as well as exciting currents. To secure such an arrangement the taps or connections 6, 6′, 6″ can be omitted and the circuits determined by the sliprings 8, 8′, 8″ used as working and as exciting circuits. This would mean the use of a much larger frequency converter but the converter shown in Fig. 3 whether driven at sub or at supersynchronous speeds is available for use in the manner described.

It will be understood that instead of using transformers such as 37, 38, 39 the primary winding 5 of the motor can be suitably tapped or an auxiliary winding can be located on the primary in inductive relation to 5 and arranged to supply that magnitude of voltage which it is desired to impress on the frequency converter used as an exciter.

While I prefer to locate the working taps 6, 6′, 6″ symmetrically with respect to the exciting taps 8, 8′, 8″ or to form the exciting circuits in 7 by closing said winding by means of taps located at the neutral points of the working paths determined by the taps 6, 6′, 6″ yet it is to be understood that I can displace the secondary exciting from the secondary working paths on the secondary by space angles which will not give symmetrical distributions of the exciting currents in 7 with respect to the working currents therein or vice versa.

The stationary members 27, 41 of the frequency converters can be made integral with the revolving member as is well understood and said converters may be provided with a plurality of windings, one being connected to sliprings and one or more others to a commutator or commutators.

Throughout this specification the term primary member is applied to that member which carries the windings connected to the supply, which windings carry the line working currents, and whether or not these primary windings produce the revolving flux of the motor which flux always revolves synchronously with respect to the primary member. The other member is referred to as secondary, whether or not it carries a winding or windings which produce all or a part of the revolving flux.

It is well known that any motor can be operated as a generator provided it be driven by a prime mover at a suitable speed, and it is also generally recognized that non-synchronous polyphase motors are no exception to this rule. It is further known that in the case of an asynchronous motor the voltages generated by the primary flux in any winding on the secondary change their direction when the machine passes from sub to supersynchronous speeds, thereby causing the machine to send working currents back to the line instead of drawing such currents from the supply. To keep the exciting circuits free from other than exciting currents is, of course, desirable whether the machine operates as a motor or as a generator. It is, therefore, to be understood that the terms used with reference to motor structures and operation are employed descriptively rather than limitatively.

While theories have been advanced in connection with the machines referred to herein, this has been done with a view to facilitate their description and understanding but it is to be understood that I do not bind myself to these or any others.

It is clear that various changes may be made in the details of this disclosure without departing from the spirit of this invention, and it is, therefore, to be understood that this invention is not to be limited to the specific details here shown and described. In the appended claims I am to cover all the modifications which are within the scope of my invention.

Having thus described the invention what I claim is:

1. The method of operating an asynchronous induction motor comprising, impressing polyphase voltages on the primary to induce working voltages in polyphase working and polyphase exciting paths on the secondary, closing the secondary exciting paths over impedances to start and accelerate the motor, closing the secondary working paths after the motor has reached a speed near its operating speed and in a way to facilitate the formation of working currents in the so formed working circuits, disconnecting the secondary exciting paths from the starting impedances after the secondary working circuits are formed, and thereafter connecting the secondary exciting paths to auxiliary polyphase voltages to produce at least part of the revolving field of the motor from the secondary.

2. The method of operating an asynchronous induction motor comprising, impressing polyphase voltages on the primary to induce working voltages in polyphase working and polyphase exciting paths on the secondary, closing the secondary exciting paths over impedances to start and accelerate the motor, closing the secondary working paths after the motor has reached a speed near its operating speed and in a way to facilitate the formation of working currents in the so formed working circuits, disconnecting the secondary exciting paths from the starting impedances after the secondary working circuits are formed, and thereafter connecting the secondary exciting paths to auxiliary polyphase voltages to produce at least part of the revolving field of the motor from the secondary and to oppose the formation of working currents in the revolving field producing circuits.

3. The method of operating an asynchronous induction motor comprising, impressing polyphase voltages on the primary to induce working voltages in polyphase working and polyphase exciting paths on the secondary, closing the secondary exciting paths over impedances to start and accelerate the motor, closing the secondary working paths after the motor has reached a speed near its operating speed and in a way to facilitate the formation of working currents in the so formed working circuits, disconnecting the secondary exciting paths from the starting impedances after the secondary working circuits are formed, and thereafter impressing on the secondary exciting paths polyphase exciting voltages of secondary frequency to produce at least part of the revolving field of the motor from the secondary and oppose the formation of the working currents in the revolving field producing circuits.

4. The method of operating an asynchronous induction motor comprising, impressing polyphase voltages on the primary to induce working voltages in polyphase working and polyphase exciting paths on the secondary, closing the secondary exciting paths over impedances to start and accelerate the motor, closing the secondary working paths after the motor has reached a speed near its operating speed and in a way to facilitate the formation of working currents in the so formed working circuits, disconnecting the secondary exciting paths from the starting resistances after the secondary working circuits are formed, and keeping the currents in the revolving field producing circuits approximately constant irrespective of motor load variations.

5. In a polyphase asynchronous induction motor, a primary, a secondary, polyphase working and exciting paths on the secondary in inductive relation to the primary, means for closing the working paths, starting impedances, a source of auxiliary polyphase voltages, means for connecting the secondary exciting paths to said starting impedances to start and accelerate the motor, and means for connecting the secondary exciting paths to said source to produce from the secondary and in normal operation at least part of the revolving field of the motor.

6. In a polyphase asynchronous induction motor, a primary, a secondary, a winding on the secondary, displaced polyphase working and exciting paths through the secondary winding in inductive relation to the primary, means for closing the working paths, starting impedances, a source of auxiliary polyphase voltages, means for closing the secondary exciting paths through said starting impedances to start and accelerate the motor, and means for connecting the said source in circuit with the secondary exciting paths to produce from the secondary and in normal operation at least part of the revolving field of the motor.

7. In a polyphase asynchronous induction motor, a primary, a secondary, polyphase working and exciting paths on the secondary in inductive relation to the primary, means within the motor to close the working paths after the motor has started, starting impedances external to the motor, means for connecting the exciting paths to the starting impedances during the starting operation, and means including said exciting paths for producing in normal operation at least part of the revolving field of the motor from the secondary.

8. In a polyphase asynchronous induction motor, a primary, a secondary, polyphase working and exciting paths on the secondary in inductive relation to the primary, automatic means adapted to close the working paths after the motor has started, starting impedances external to the motor, means for connecting the exciting paths to the starting impedances during the starting operation, and means including said exciting paths for producing in normal operation at least part of the revolving field of the motor from the secondary.

9. In a polyphase asynchronous induction motor, a primary, a secondary, polyphase working and exciting paths on the secondary in inductive relation to the primary, means within the motor adapted to close the working paths after the motor has started, sliprings connected to the exciting paths, starting impedances, a source of polyphase voltages of secondary frequency, and means for connecting the sliprings alternately to the starting impedances and to said source.

10. In a polpphase asynchronous induction motor, a primary, a secondary, a winding on the secondary, polyphase working and exciting paths through the secondary winding in inductive relation to the primary, means within the motor adapted to close the working paths after the motor has started, sliprings connected to the exciting paths, starting impedances, a source of polyphase voltages of secondary frequency, and means for alternately connecting the sliprings to the starting impedances and to said source.

11. In a polyphase asynchronous induction motor, a primary, a secondary, an $n$-phase mesh connected winding on the secondary, means for shortcircuiting alternate phase connections of said secondary winding adapted to form $n/2$ phase working circuits in inductive relation to the primary, frequency converting means, starting means, and means for connecting the other phase connections of said secondary to the starting means to start the motor and to the converting means after the motor has reached a sufficient speed to produce at least part of the revolving field of the motor from the secondary.

12. In a polyphase asynchronous induction motor, a primary, a secondary, a winding on the secondary provided with a plurality of taps, frequency converting means, starting means, means for shortcircuiting some of the taps of said secondary winding adapted to form working circuits in inductive relation to the primary, means for connecting the remaining taps of said secondary winding to the starting means to start the motor, and means comprising said frequency converting means for connecting said remaining taps to the converting means after the motor has reached a sufficient speed to produce at least part of the revolving field of the motor from the secondary, at least part of the conductors on the secondary being included in working as well as in the revolving flux producing circuits.

13. In a polyphase asynchronous induction motor, a primary, a secondary, an $n$-phase mesh connected winding on the secondary, means for shortcircuiting alternate phase connections of said secondary winding adapted to form $n/2$ phase working circuits in inductive relation to the primary, frequency converting means, means including said converting means and the other phase connections of said secondary adapted to form $n/2$ phase exciting circuits in inductive relation to the primary and to produce at least part of the revolving field of the motor from the secondary, means for utilizing the exciting circuits to start the motor, and means for keeping the currents in the revolving field producing circuits approximately constant over a range of loads.

14. In a polyphase asynchronous induction motor, a primary, a secondary, an $n$-phase mesh connected winding on the secondary, means for shortcircuiting alternate phase connections of said secondary winding adapted to form $n/2$ phase working circuits in inductive relation to the primary, frequency converting means, means including said converting means and the other phase connections of said secondary adapted to form $n/2$ phase exciting circuits in inductive relation to the primary and to produce at least part of the revolving field of the motor from the secondary, means for utilizing the exciting circuits to start the motor, and impedances in the high frequency part of the secondary exciting circuits.

15. In a polyphase asynchronous induction motor, a primary, a secondary, a winding on the secondary in inductive relation to the primary, means determining polyphase working and displaced polyphase exciting paths through said winding, frequency changing means, means including the frequency changing means and the exciting paths to produce at least part of the revolving field of the motor from the secondary, and impedances in the high frequency part of the secondary exciting circuits adapted to exclude working currents from the exciting circuits at least at one motor load.

In testimony whereof I affix my signature this 16th day of December, 1925.

VALÈRE A. FYNN.